United States Patent
Dillon, IV et al.

(10) Patent No.: US 6,263,659 B1
(45) Date of Patent: Jul. 24, 2001

(54) AIR SEPARATION PROCESS INTEGRATED WITH GAS TURBINE COMBUSTION ENGINE DRIVER

(75) Inventors: John Lloyd Dillon, IV, Kutztown; John Louis Griffiths, Emmaus, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/326,219

(22) Filed: Jun. 4, 1999

(51) Int. Cl.$^7$ ................................................... F02G 3/00
(52) U.S. Cl. .................. 60/39.02; 60/39.05; 60/39.12; 60/39.03; 60/726; 75/466
(58) Field of Search ............................... 60/39.02, 39.05, 60/39.12, 39.03; 75/466

(56) References Cited

U.S. PATENT DOCUMENTS

| | | | |
|---|---|---|---|
| 3,731,495 | 5/1973 | Coveney | ................................... 62/39 |
| 3,950,957 | 4/1976 | Zakon | ...................................... 62/30 |

(List continued on next page.)

FOREIGN PATENT DOCUMENTS

| | | |
|---|---|---|
| 19529681 | 2/1997 | (DE) . |
| 845644 A2 | 6/1998 | (EP) . |
| 1455960 | 11/1996 | (GB) . |

OTHER PUBLICATIONS

Allam, R. J., et al., "Future Direction of Air Separation Design for Gasification, IGCC and Alternative Fuel Projects", *Gasification–The Gateway to a Cleaner Future*, Ichem Conference, Sep. 23–24, 1998, Dresden, Germany.

Smith, A. R., et al., "Next–Generation Integration Concepts for Air Separation Units and Gas Turbines", *Journal of Engineering for Gas Turbines and Power*, Apr. 1997, vol. 119, pp 298–304.

Smith, A. R., et al., "Integration of Oxygen Plants and Gas Turbines in IGCC Facilities", *Presented at the American Power Conference 58$^{th}$ Annual Meeting*, Apr. 9–11, 1996, Chicago, IL.

Welsh, R.J., et al., "The Gas Turbine Manual", Temple Press Limited, London, 1955, p. 37.

*Primary Examiner*—Timothy S. Thorpe
*Assistant Examiner*—Ed Hayes
(74) *Attorney, Agent, or Firm*—John M. Fernbacher

(57) ABSTRACT

A method for the separation of a feed gas mixture comprising oxygen and nitrogen in which an oxidant gas and fuel are combusted in a combustion engine to generate shaft work and a hot exhaust gas, the feed gas mixture comprising oxygen and nitrogen is compressed, and the resulting compressed feed gas mixture is separated into two or more product gas streams with differing compositions. The shaft work of the combustion engine is utilized to provide at least a portion of the work required for compressing the feed gas mixture, one of the product gas streams by is heated by indirect heat exchange with the hot exhaust gas from the combustion engine, and the resulting heated product gas is work expanded to generate shaft work and yield an expanded product gas stream. The combustion engine may be a gas turbine combustion engine.

23 Claims, 6 Drawing Sheets

U.S. PATENT DOCUMENTS

| | | | |
|---|---|---|---|
| 4,019,314 | 4/1977 | Springmann | 60/39.02 |
| 4,224,045 | 9/1980 | Olszewski et al. | 62/30 |
| 4,250,704 | 2/1981 | Bruckner et al. | 60/39.12 |
| 4,631,915 | 12/1986 | Frewer et al. | 60/39.12 |
| 4,697,415 | 10/1987 | Schiffers | 60/39.12 |
| 4,707,994 | 11/1987 | Shenoy et al. | 62/11 |
| 4,729,217 | 3/1988 | Kehihofer | 60/39.02 |
| 4,785,621 | 11/1988 | Alderson et al. | 60/39.12 |
| 4,962,646 | 10/1990 | Rathbone | 62/24 |
| 5,040,370 | 8/1991 | Rathbone | 60/648 |
| 5,076,837 | 12/1991 | Rathbone et al. | 75/433 |
| 5,081,845 | 1/1992 | Allam et al. | 62/24 |
| 5,251,450 | 10/1993 | Agrawal et al. | 62/25 |
| 5,251,451 | 10/1993 | Xu et al. | 62/25 |
| 5,257,504 | 11/1993 | Agrawal et al. | 62/24 |
| 5,268,019 * | 12/1993 | Rathbone | 75/466 |
| 5,317,862 | 6/1994 | Rathbone | 60/39.05 |
| 5,388,395 | 2/1995 | Scharpf et al. | 60/39.02 |
| 5,406,786 | 4/1995 | Scharpf et al. | 60/39.05 |
| 5,410,869 | 5/1995 | Muller | 60/39.02 |
| 5,421,166 | 6/1995 | Allam et al. | 62/24 |
| 5,437,150 | 8/1995 | Latham et al. | 60/39.02 |
| 5,459,994 | 10/1995 | Drnevich | 60/39.02 |
| 5,666,823 | 9/1997 | Smith et al. | 62/646 |
| 5,722,259 | 3/1998 | Sorensen et al. | 62/646 |
| 5,740,673 * | 4/1998 | Smith et al. | 60/39.02 |
| 5,979,183 * | 11/1999 | Smith et al. | 62/650 |

* cited by examiner

AIR SEPARATION PROCESS INTEGRATED WITH GAS TURBINE COMBUSTION ENGINE DRIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

New chemical and refining processes, and the economies of scale of such processes, will require increasing quantities of gaseous oxygen at a single location. Requirements for 15,000 tons per day, or more, of gaseous oxygen delivered at pressures of 1,250 psia or higher are anticipated for such processes. Some of these facilities requiring large quantities of gaseous oxygen will be constructed and operated at geographically remote locations.

A large air separation unit to produce gaseous oxygen requires a compressed air feed stream which is typically provided from atmospheric air by an intercooled turbocompressor driven by an electric motor. Electric motor driven turbocompressors also are utilized to compress the gaseous oxygen and other air separation process by-products.

As the required capacities for air separation units increase, electric power requirements for compressor drivers also increase. The power demand for a large air separation unit using an electrically-driven turbocompressor may exceed the capabilities of the available electric power system. At remote locations, imported electric power may be essentially unavailable. In such cases, onsite electric power generation systems may be required.

If natural gas, liquid fuel, or fuel synthesized in a chemical or refining process is available, the turbocompressor supplying air to the air separation unit may be mechanically driven by a gas turbine combustion engine. This avoids both the need for an electric power generating and transmission system, and the associated electric generating and transmission energy losses. However, the temperature of the exhaust stream from a gas turbine combustion engine operating with a simple Brayton cycle is in the range of 700° F. to 1100° F., and the exhaust represents a major portion of the heat generated by combustion in the gas turbine engine. Typically the expansion turbine exhaust is used to generate steam which is expanded a steam bottoming cycle to drive an electric generator or other rotating machinery.

Comprehensive reviews of integration methods for gas turbines and air separation systems are given in a paper entitled "Next-Generation Integration Concepts for Air Separation Units and Gas Turbines" by A. R. Smith et al in *Transactions of the ASME*, Vol. 119, April 1997, pp. 298–304 and in a presentation entitled "Future Direction of Air Separation Design for Gasification, IGCC, and Alternative Fuel Projects" by R. J. Allam et al, IChem$^E$ Conference on Gasification, Sep. 23–24 1998, Dresden, Germany.

A common mode of integration between the gas turbine and air separation units is defined as full air and nitrogen integration. In this operating mode, all air for the gas turbine combustor and the air separation unit is provided by the gas turbine air compressor which is driven by the gas turbine expander, and nitrogen from the air separation unit is utilized in the integrated system. Full air and nitrogen integration is described in representative U.S. Pat. Nos. 3,731,495, 4,224,045, 4,250,704, 4,631,915, and 5,406,786, wherein the nitrogen is introduced into the gas turbine combustor. Full air and nitrogen integration also is described in U.S. Pat. Nos. 4,019,314 and 5,317,862, and in German Patent Publication DE 195 29 681 A1, wherein the nitrogen is work expanded to provide work of compression for the air feed or to generate electric power.

The gas turbine and air separation unit can operate in an alternative mode, defined as partial air integration with full nitrogen integration, in which a portion of the air feed for the air separation unit is provided by the gas turbine compressor and the remainder is provided by a separate air compressor driven by a driver with an independent power source. Nitrogen from the air separation unit is introduced into the gas turbine combustor or is otherwise work expanded. This operating mode is described in representative U.S. Pat. Nos. 4,697,415; 4,707,994; 4,785,621; 4,962,646; 5,437,150; 5,666,823; and 5,740,673.

In another alternative, nitrogen integration is used without air integration. In this alternative, the gas turbine and air separation unit each has an independently-driven air compressor, and the nitrogen from the air separation unit is used in the gas turbine combustor. This option is described in representative U.S. Pat. Nos. 4,729,217; 5,081,845; 5,410,869; 5,421,166; 5,459,994; and 5,722,259.

U.S. Pat. No. 3,950,957 and Great Britain Patent Specification 1 455 960 describe an air separation unit integrated with a steam generation system in which a nitrogen-enriched waste stream is heated by indirect heat exchange with hot compressed air from the air separation unit feed air compressor, the heated nitrogen-enriched stream is further heated indirectly in a fired heater, and the final hot nitrogen-enriched stream is work expanded in a dedicated nitrogen expansion turbine. The work generated by this expansion turbine drives the air separation unit feed air compressor. The nitrogen expansion turbine exhaust and the combustion gases from the fired heater are introduced separately into a fired steam generator to raise steam, a portion of which may be expanded in a steam turbine to drive the air separation unit main air compressor. Optionally, the combustion gases from the fired heater are expanded in a turbine which drives a compressor to provide combustion air to a separate fired heater which heats the nitrogen-enriched stream prior to expansion.

An alternative use for high pressure nitrogen from an air separation unit integrated with a gas turbine is disclosed in U.S. Pat. No. 5,388,395 wherein the nitrogen is work expanded to operate an electric generator. The cold nitrogen exhaust from the expander is mixed with the inlet air to the gas turbine compressor thereby cooling the total compressor inlet stream. Alternatively, low pressure nitrogen from the air separation unit is chilled and saturated with water in a direct contact cooler-chiller, and the chilled, saturated nitrogen is mixed with the inlet air to the gas turbine compressor.

U.S. Pat. Nos. 5,040,370 and 5,076,837 disclose the integration of an air separation unit with high-temperature processes which uses oxygen, wherein waste heat from a process is used to heat pressurized nitrogen from the air separation unit, and the hot nitrogen is work expanded to generate electric power.

European Patent Publication EP 0 845 644 A2 describes an elevated pressure ir separation unit in which the pressurized nitrogen-enriched product is heated indirectly by the combustion of low pressure fuel, and the hot nitrogen is work expanded to produce power or drive gas compressors within the air separation unit.

As indicated the above discussion of the background art, the recovery of heat from a gas turbine combustion engine exhaust typically is achieved by a heat recovery steam generation (HRSG) system which comprises a heat exchanger with numerous boiler tubes to vaporize boiler feed water, a steam turbine for work expansion of the steam, a condenser to condense the expanded steam, and a boiler feedwater makeup and recirculation system. In some situations, however, such a steam system may not be feasible for economic or operational reasons, and alternative methods for recovering heat from the gas turbine exhaust would be required. When the preferred method for driving a turbocompressor supplying air to an air separation unit is by a gas turbine combustion engine, such an alternative method for recovering heat from the gas turbine exhaust would be desirable.

The invention disclosed below and defined by the claims which follow addresses the need for gas turbine driven air separation units which use alternative methods of recovering and utilizing the heat in the gas turbine exhaust gas.

BRIEF SUMMARY OF THE INVENTION

The invention is a method for the separation of a feed gas mixture comprising oxygen and nitrogen, wherein the method comprises: (a) compressing a first gas mixture comprising oxygen to yield a compressed oxidant gas and combusting the compressed oxidant gas and fuel in a combustion engine to generate shaft work and a hot exhaust gas; (b) compressing a second gas mixture comprising oxygen and nitrogen to yield a compressed feed gas mixture, and separating the compressed feed gas mixture into two or more product gas streams with differing compositions; (c) utilizing the shaft work of (a) to provide at least a portion of the work required for compressing the second gas mixture of (b); and (d) heating one of the product gas streams by indirect heat exchange with the hot exhaust gas and work expanding the resulting heated product gas stream to generate shaft work and yield an expanded product gas stream.

The combustion engine can be a gas turbine combustion engine or alternatively can be an internal combustion engine.

The second gas mixture can be air, one of the product gas streams can be an oxygen-enriched product gas, and another of the product gas streams can be a nitrogen-enriched product gas. The nitrogen-enriched product gas can provide the product gas of (d), wherein the nitrogen-enriched product gas would be heated by indirect heat exchange with the hot exhaust gas, and wherein the resulting heated nitrogen-enriched product gas would be work expanded in a nitrogen-enriched product gas expansion turbine to generate shaft work and yield a reduced-pressure nitrogen-enriched product gas stream.

The air can be separated into the oxygen-enriched product gas and the nitrogen-enriched product gas by cryogenic distillation.

The oxygen-enriched product gas can be compressed in an oxygen product compressor, and at least a portion of the work required by the oxygen product compressor can be provided by shaft work generated by the nitrogen-enriched product gas expansion turbine. The nitrogen-enriched product gas can be compressed in a nitrogen-enriched product compressor before being heated by indirect heat exchange with the hot exhaust gas, and a portion of the work required by the nitrogen-enriched product compressor can be provided shaft work generated by the nitrogen-enriched product expansion turbine.

The heating of the nitrogen-enriched product gas by indirect heat transfer with the hot exhaust gas yields a cooled exhaust gas, and the cooled exhaust gas and the reduced-pressure nitrogen-enriched product gas stream can be further cooled by indirect heat transfer with a process stream to yield a heated process stream. The process stream can be water, in which case the heated process stream would be steam.

The heating of the nitrogen-enriched product gas by indirect heat transfer with the hot exhaust gas yields a cooled exhaust gas, and the cooled exhaust gas and the reduced-pressure nitrogen-enriched product gas can be combined in a heat recovery exchanger and the combined gas further cooled therein by indirect heat transfer with a process stream to yield a heated process stream.

The invention may further comprise reheating the reduced-pressure nitrogen-enriched product gas by indirect heat transfer with the hot exhaust gas and work expanding the resulting reheated nitrogen-enriched product gas in another nitrogen-enriched product gas expansion turbine to yield a final nitrogen-enriched product gas at a further reduced pressure. The oxygen-enriched product gas can be compressed in an oxygen product compressor, and at least a portion of the work required by the oxygen product compressor can be provided by shaft work generated by the nitrogen-enriched product gas expansion turbines. The nitrogen-enriched product gas can be compressed in a nitrogen-enriched product compressor before being heated by indirect heat transfer with the hot exhaust gas, and a portion of the work required by the nitrogen-enriched product compressor can be provided by shaft work generated by the nitrogen-enriched product expansion turbines.

The heating of the nitrogen-enriched product gas by indirect heat transfer with the hot exhaust gas yields a cooled exhaust gas, and the cooled exhaust gas and the reduced-pressure nitrogen-enriched product gas can be further cooled by indirect heat transfer with a process stream to yield a heated process stream. The process stream can be water, in which case the heated process stream would be a heated water stream such as steam or heated boiler feed water.

The heating of the nitrogen-enriched product gas by indirect heat transfer with the hot exhaust gas yields a cooled exhaust gas, and the cooled exhaust gas and final nitrogen-enriched product gas at a further reduced pressure can be combined in a heat recovery steam generator, wherein the combined gas would be further cooled therein by indirect heat transfer with water to yield a heated water stream such as steam or heated boiler feed water.

The heating of the nitrogen-enriched product gas and the reheating of the reduced-pressure nitrogen-enriched product gas by indirect heat transfer with the hot exhaust gas yields a cooled exhaust gas, and the cooled exhaust gas and the final nitrogen-enriched product gas at a further reduced pressure can be further cooled by indirect heat transfer with a process stream to yield a heated process stream.

The invention includes an apparatus for the separation of air which comprises:
- (a) a first air compressor to compress air, thereby providing a first pressurized air feed stream;
- (b) a second air compressor to compress air, thereby providing a second pressurized air feed stream;
- (c) a gas turbine combustor for combusting fuel with the first pressurized air feed stream to yield a hot pressurized gas and a gas turbine expansion turbine for work expanding the hot pressurized gas to yield a hot exhaust gas, wherein the gas turbine expansion turbine is mechanically linked with the first and second air compressors such that work from the gas turbine expansion turbine drives the first and second air compressors;

(d) piping means for flow of the first pressurized air feed stream from the first air compressor to the gas turbine combustor and for flow of the hot pressurized gas from the gas turbine combustor to the gas turbine expansion turbine;

(e) an air separation system to separate the second pressurized air feed stream into at least an oxygen-enriched product gas and a nitrogen-enriched product gas;

(f) piping means for flow of the second pressurized air feed stream from the second air compressor to the air separation system;

(g) heat exchange means to heat the nitrogen-enriched product gas by indirect heat exchange with hot exhaust gas from the gas turbine expansion turbine;

(h) a hot nitrogen-enriched product gas expansion turbine for work expanding the resulting hot nitrogen-enriched product gas from the heat exchange means; and (i) piping means for flow of the nitrogen-enriched product gas from the air separation system to the heat exchange means and for flow of the hot exhaust gas from the gas turbine expansion turbine to the heat exchange means.

DETAILED DESCRIPTION OF THE INVENTION

Figure 1:
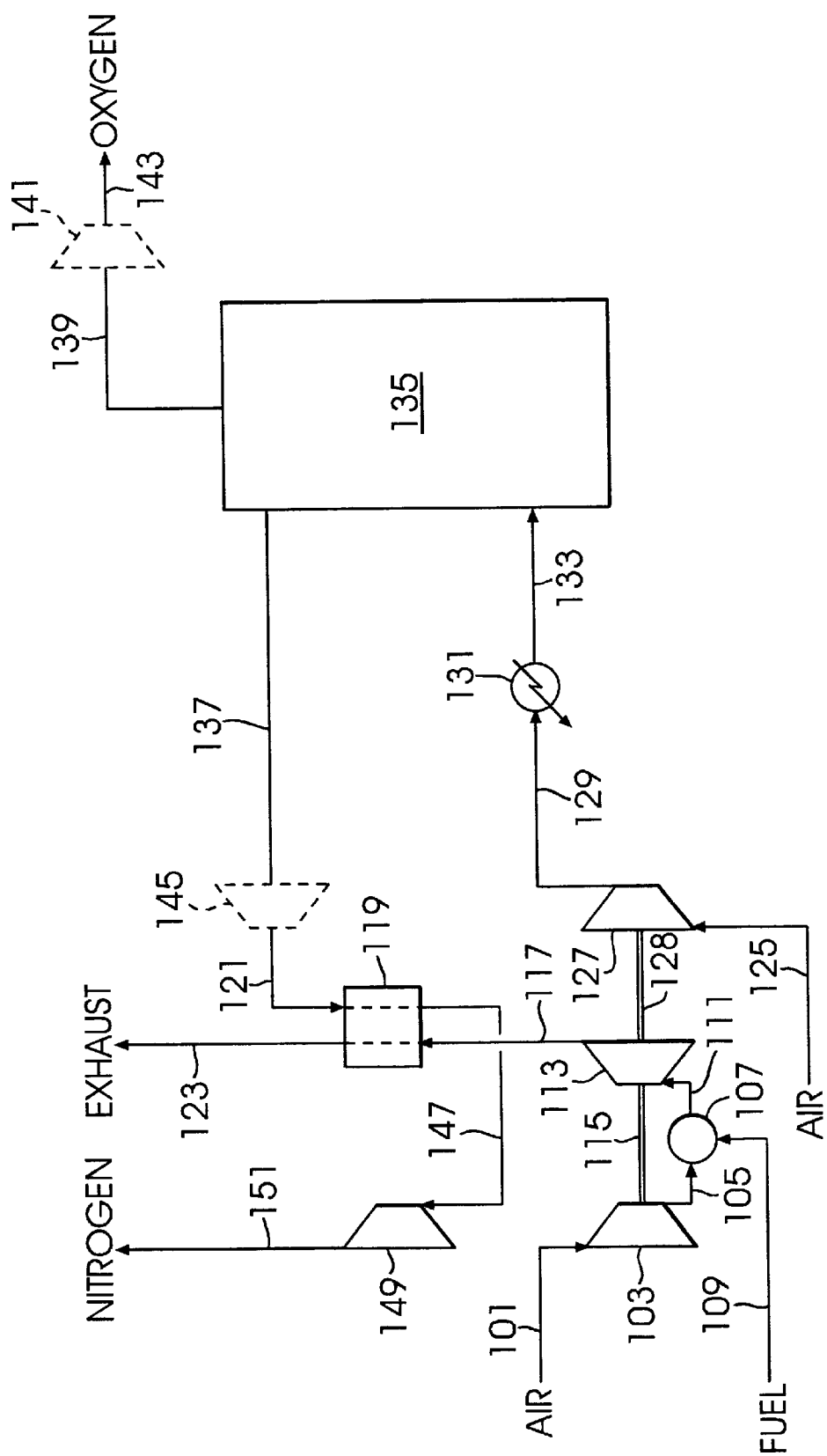
FIG. 1 is a schematic flow diagram of the base embodiment of the process of the present invention.

A first embodiment of the invention is illustrated in FIG. 1. An oxygen-containing gas feed stream, typically atmospheric air, as stream 101 is compressed in turbocompressor 103 to 48–590 psia and 160–1500° F. Compressed air stream 105 is combusted in combustor 107 with fuel stream 109 to produce hot pressurized combustion gas stream 111. Fuel stream 109 can be any appropriate fuel compatible with the operation of combustor 107.

Hot pressurized combustion gas stream 111 is expanded in expansion turbine 113 to produce useful work, and expansion turbine exhaust stream 117 is discharged at near atmospheric pressure and 200 to 1600° F. This expansion step can be defined as work expansion. Work generated by expansion turbine 113 drives turbocompressor 103 by shaft 115, and if desired additional work may be generated to drive other rotating equipment (not shown). Exhaust stream 117 is cooled in heat exchanger 119 by indirect heat exchange with pressurized nitrogen-enriched stream 121 (later defined), and the resulting cooled stream 123 is vented to the atmosphere.

A second oxygen-containing gas stream 125, typically atmospheric air but which could be any mixture containing oxygen and nitrogen, and possibly other gases, is compressed in turbocompressor 127, which in this embodiment can be an intercooled multiple-stage turbocompressor, to 48–590 psia. Turbocompressor 127 is driven by shaft 128 using work from expansion turbine 113. Compressed air stream 129 is cooled in aftercooler 131, and final cooled air feed stream 133 is introduced into air separation system 135.

Within air separation system 135, the air feed stream may be treated in a contaminant removal system (not shown), for example, a thermal swing adsorption (TSA) process, to remove water, carbon dioxide, and other impurities before the feed air is separated. The purified air feed stream is separated in air separation system 135, for example using a cryogenic air separation process, whereby the feed air is separated into nitrogen-enriched product stream 137 and oxygen-enriched product stream 139. The term "oxygen-enriched" as used herein refers to any gas stream having a higher oxygen concentration than air and the term "nitrogen-enriched" as used herein refers to any gas stream having a higher nitrogen concentration than air. Nitrogen-enriched product stream 137 typically contains 80 to 99.999 mole % nitrogen and typically is at near ambient temperature and a pressure of slightly above atmospheric to 590 psia. Oxygen-enriched product stream 139 typically contains 50 to 99.9 mole % oxygen and usually is at near ambient temperature and a pressure of slightly above atmospheric up to about 1200 psia. The oxygen-enriched product can be further compressed if necessary in oxygen product compressor 141 to yield final oxygen product 143. Optionally, an argon-enriched product stream can be recovered in addition to the oxygen-enriched and/or nitrogen-enriched product streams.

When oxygen-containing gas stream 125 is a gas mixture containing oxygen and nitrogen but is not air, the term "oxygen-enriched" as used herein refers to any gas stream having a higher oxygen concentration than the feed stream and the term "nitrogen-enriched" as used herein refers to any gas stream having a higher nitrogen concentration than the feed stream.

Air separation system 135 can be an elevated pressure (EP) cryogenic air separation process in which feed air at a pressure above about 100 psia is separated into oxygen-enriched and nitrogen-enriched streams at pressures above atmospheric. In this well-known method, the purified pressurized air feed is further cooled, at least partially condensed, and distilled in one or more distillation columns. Nitrogen-enriched product 137 typically is produced at a pressure in the range of 40 to 300 psia. Refrigeration typically is provided by work expansion of one or more of the internal process streams. Representative EP air separation systems are described in U.S. Pat. Nos. 5,740,673, 5,666,823, and 5,421,166.

Alternatively, air separation system 135 can be any low pressure cryogenic air separation process known in the art in which a portion of the feed air is separated into oxygen-enriched and nitrogen-enriched streams at pressures above atmospheric. In this case, nitrogen-enriched product stream 137 typically is delivered at a pressure in the range of atmospheric to 150 psia. The nitrogen-enriched product stream 137 can be compressed in compressor 145 to yield pressurized nitrogen-enriched stream 121. Pressurized nitrogen-enriched stream 121 in the pressure range of about 30 to 1000 psia is heated against exhaust stream 117 in heat exchanger 119, and the resulting hot, pressurized nitrogen-enriched stream 147 is work expanded to a pressure slightly above atmospheric in nitrogen-enriched product expansion turbine 149 to produce shaft work. Cooled expanded nitrogen-enriched stream 151 can be vented to the atmosphere or used elsewhere if desired. Shaft work produced by nitrogen-enriched product expansion turbine 149 can be used to drive gas compression equipment within the process, for example oxygen compressor 141 earlier described. Alternatively or additionally, the shaft work produced by expansion turbine 149 can provide a portion of the work required to drive feed air compressor 127 and gas turbine air compressor 103. If nitrogen-enriched product compressor 145 is required, a portion of the work to drive this compressor can be provided by the shaft work generated by nitrogen-enriched product expansion turbine 149.

Recovering work from gas turbine exhaust stream 117 in the embodiments described above is accomplished in the present invention by an alternative to the usual heat recovery steam generation system and steam bottoming cycle earlier described. By recovering heat using a product gas stream from the air separation unit, the required process equipment is significantly reduced by eliminating the heat recovery steam generator (boiler); the boiler feedwater pump and system; the steam expansion turbine; the condenser, condensate pumps, and related equipment; and the boiler feed water demineralization system. The heat exchanger system of the present invention is more compact than a heat recovery steam generator. In addition, for most applications the product gas stream from the air separation system is dry and particle-free, and this is beneficial in the operation and maintenance of the heat exchanger and expansion turbine. Because the invention efficiently utilizes pressurized product gas, a high pressure air separation unit which uses a pumped liquid or elevated pressure cycle can be utilized. These cycles generally require smaller and less expensive equipment than other cycles, and this can be a capital cost advantage.

Figure 2:
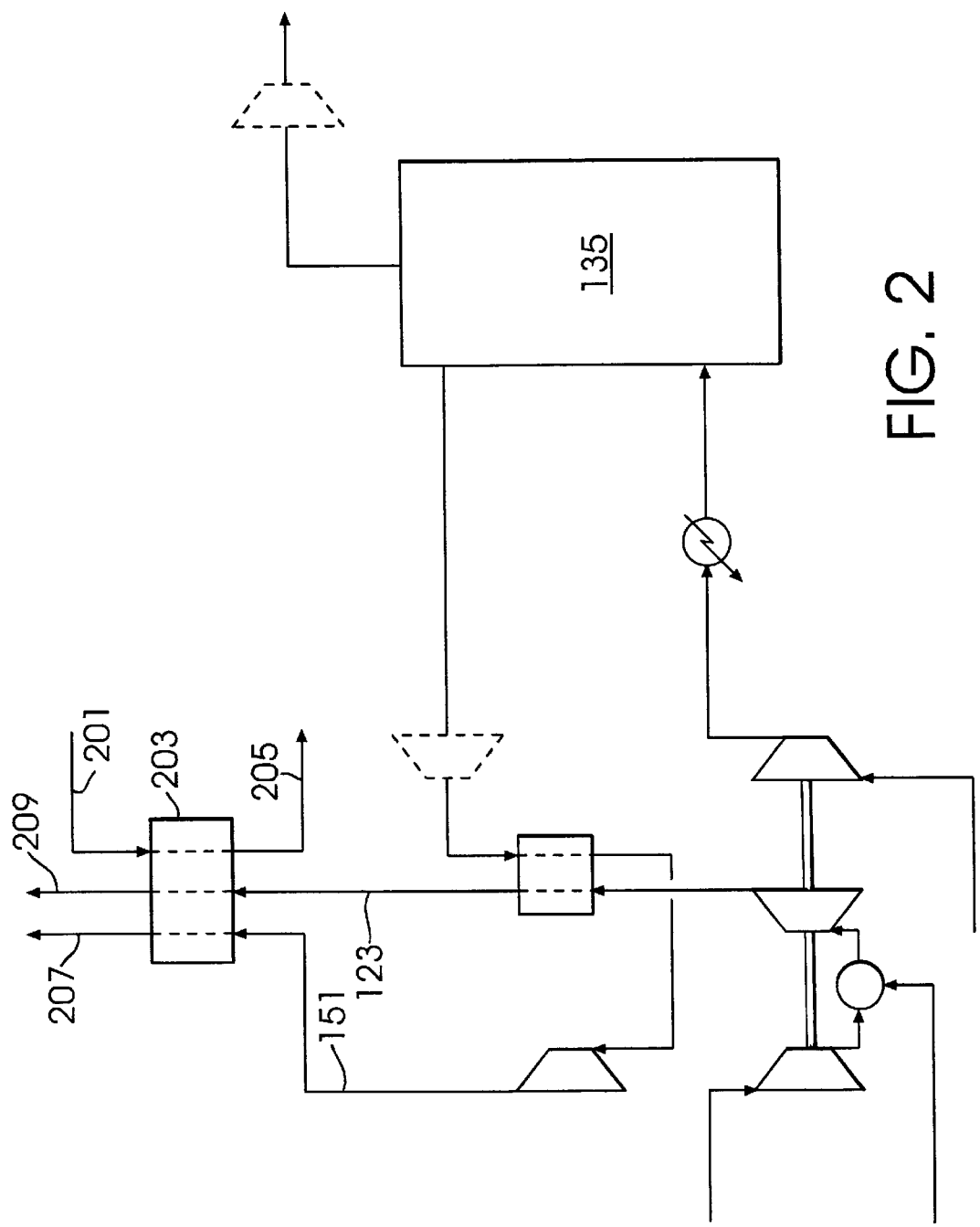
FIG. 2 is a schematic flow diagram of an embodiment of the present invention wherein residual heat in the exhaust gas streams from the gas turbine and nitrogen-enriched product expansion turbines is recovered to provide a heated process stream.

An alternative embodiment of the invention is illustrated in FIG. 2 which in which additional heat is recovered from cooled exhaust stream 123, which may be at a temperature in the range of 200 to 1300° F., and expanded nitrogen-enriched stream 151, which may be at a temperature in the range of 200 to 1300° F. These two streams exchange heat with process stream 201 in heat exchanger 203 to yield heated process stream 205, further cooled nitrogen-enriched stream 207, and final exhaust stream 209. The combustion products in final exhaust stream 209 can be maintained in a single phase without water condensation if desired by limiting the degree of heat transferred to process stream 201. Heated process stream 205 can be a stream of intermediate pressure steam which is expanded in a steam turbine (not shown) to generate electric power. Alternatively, heated process stream 205 can supply heat to a stream associated with the air separation unit 135, for example a regeneration gas stream used in the temperature swing adsorption feed air purification system. This embodiment is preferred when further cooled nitrogen-enriched stream 207 is to be used elsewhere in the process or used externally.

Alternatively, heat can be recovered individually from either or both of cooled exhaust stream 123 and expanded nitrogen-enriched stream 151 (not shown). The resulting cooled streams can be used elsewhere in the process or used externally.

Figure 3:
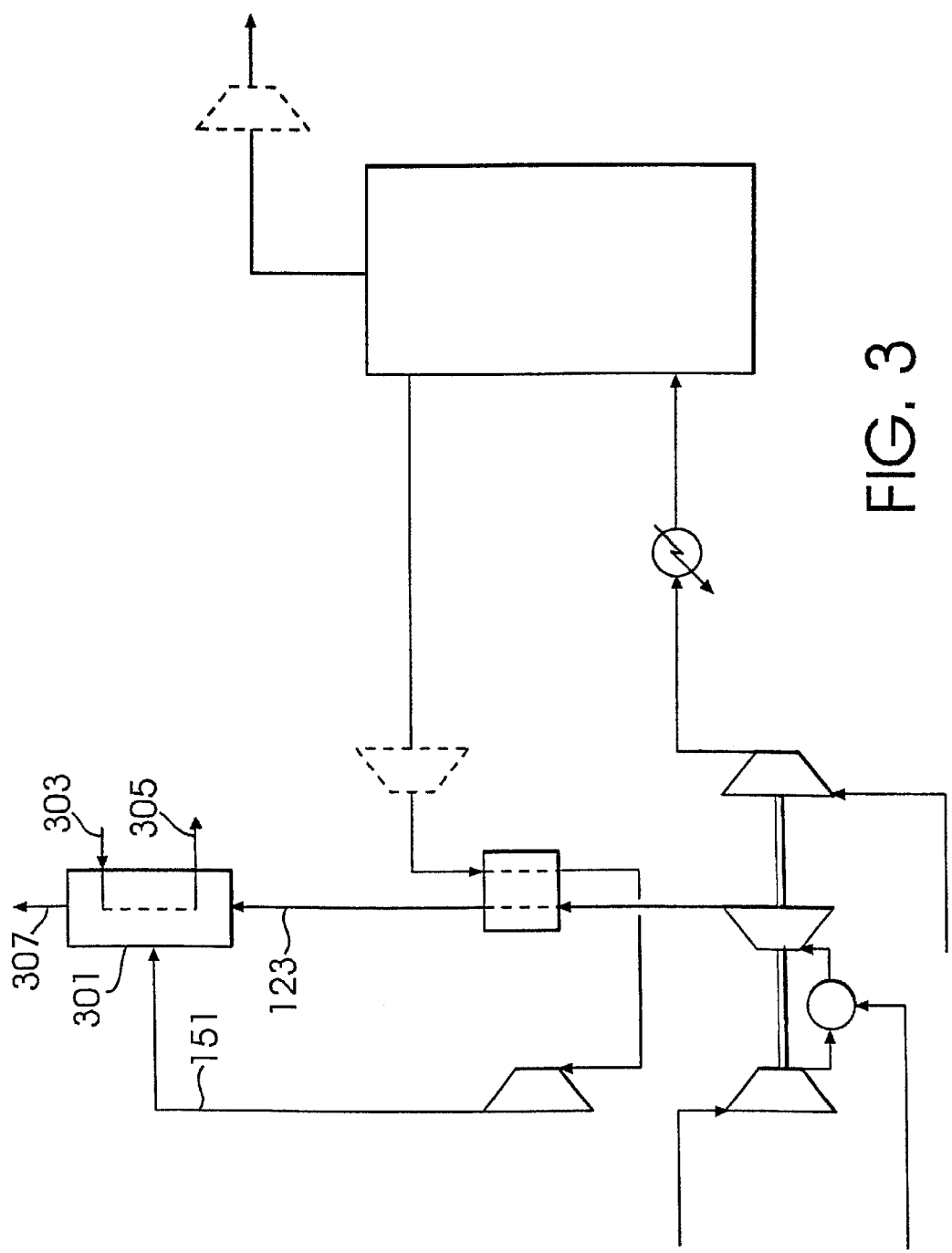
FIG. 3 is a schematic flow diagram of an alternative embodiment of the present invention wherein residual heat in the combined exhaust from combustion gas and nitrogen-enriched product expansion turbines is recovered to provide a heated process stream.

Another related alternative embodiment is illustrated in FIG. 3, in which heat is recovered from cooled exhaust stream 123 and expanded nitrogen-enriched stream 151 in heat recovery exchanger 301. In this alternative, stream 303 can be a liquid which is heated and vaporized to yield pressurized vapor stream 305, which can be expanded in an expansion turbine (not shown) to generate electric power. If desired, liquid stream 303 can be water which is vaporized to provide steam for use in the process or elsewhere. Alternatively, stream 303 can be a gaseous process stream which is heated to provide hot gas stream 305. In this embodiment, expanded nitrogen-enriched stream 151 is introduced into heat recovery exchanger 301 at a point such that the temperature of expanded nitrogen-enriched stream 151 is approximately equal to the temperature of cooled exhaust stream 123. In this embodiment, final exhaust gas 307 is a combination of exhaust stream 123 and expanded nitrogen-enriched stream 151.

Figure 4:
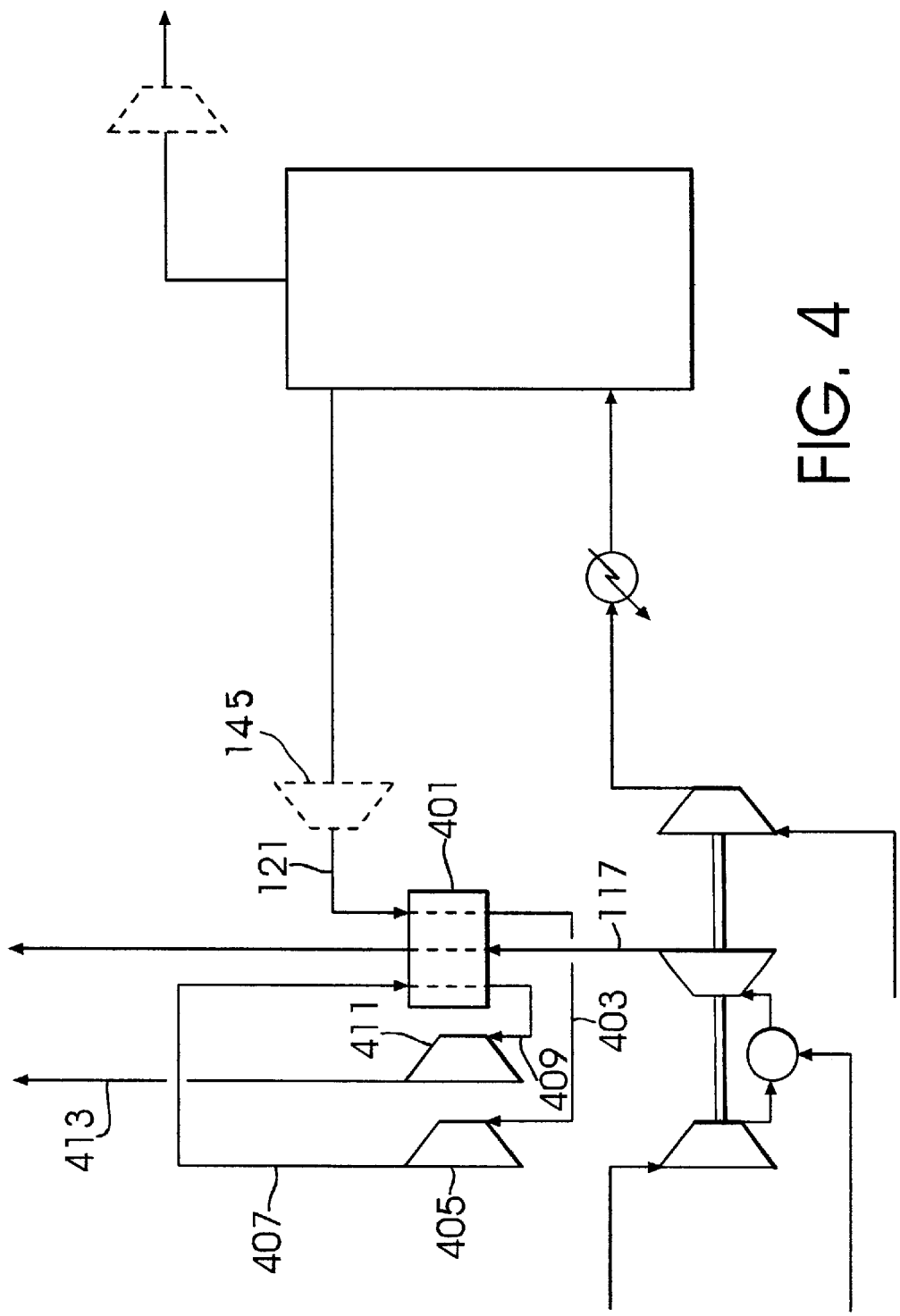
FIG. 4 is a schematic flow diagram of an embodiment of the present invention wherein the exhaust from the nitrogen-enriched product expansion turbine is reheated and expanded in another expansion turbine or turbine stage.

Another alternative embodiment related to the embodiment of FIG. 1 is illustrated in FIG. 4. In this embodiment, additional heat energy can be recovered more effectively when the mass flow rate of gas turbine exhaust stream 117 is greater than that of pressurized nitrogen-enriched stream 121. Reheat is used to balance the exchange of heat between these two streams wherein pressurized nitrogen-enriched stream 121 is heated in heat exchanger 401, heated nitrogen-enriched stream 403 is work expanded to an intermediate pressure in expansion turbine 405, intermediate expanded nitrogen-enriched stream 407 is reheated in heat exchanger 401, and reheated nitrogen-enriched stream 409 is work expanded to atmospheric pressure in expansion turbine 411 to yield final nitrogen-enriched vent stream 413. Shaft work generated by expansion turbines 405 and 411 can be to drive gas compression equipment within the process, for example oxygen compressor 141 earlier described, or can be used to generate electric power. Alternatively or additionally, the shaft work produced by nitrogen-enriched product expansion turbines 405 and 411 can provide a portion of the work required to drive feed air compressor 127 and gas turbine air compressor 103. If nitrogen-enriched product compressor 145 is required, a portion of the work to drive this compressor can be provided by the shaft work generated by nitrogen-enriched product expansion turbines 405 and 411. Shaft work from the nitrogen-enriched product expansion turbines or stages can be used alternatively to drive any other rotating machinery as required.

Nitrogen-enriched product expansion turbines 405 and 411 are shown as two separate expansion turbines, but a single two-stage expansion turbine can be used for the same service if desired.

Figure 5:
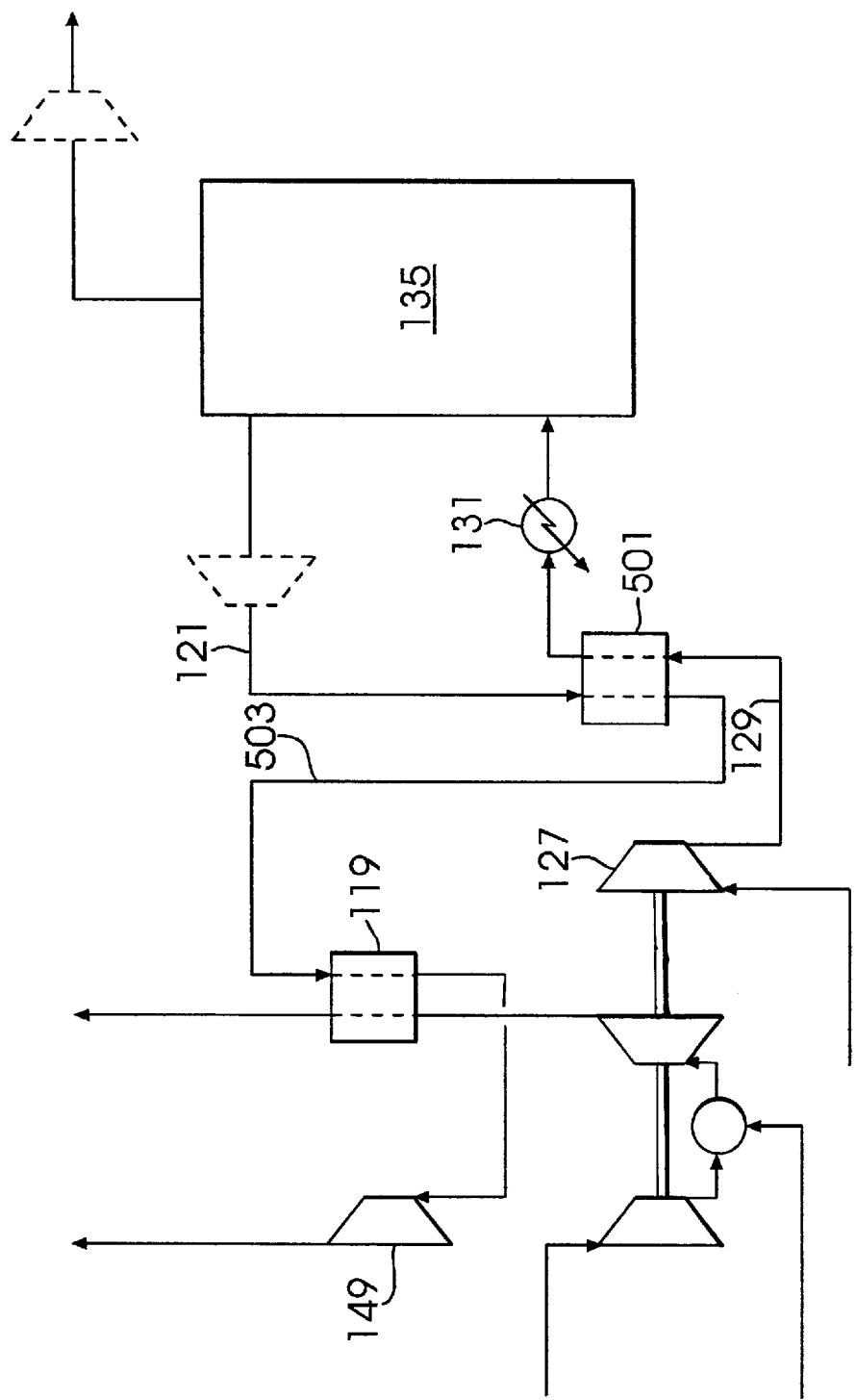
FIG. 5 is a schematic flow diagram of an embodiment of the present invention wherein compressed feed air to the air separation unit is cooled against a product gas stream from the air separation unit.

Another alternative embodiment related to the process of FIG. 1 is illustrated in FIG. 5 in which heat energy is recovered from compressed air stream 129 downstream of air compressor 127. As earlier explained, air compressor 127 typically utilizes multiple stages of compression. If intercooling of the air takes place between these stages, the temperature of compressed air stream 129 typically will be in the range of about 160 to 220° F. However, air compressor 127 may utilize a reduced level of intercooling, or alternatively may be an adiabatic compressor, in which cases the temperature of compressed air stream 129 may be as high as 1500° F. Heat may be recovered from this hot air stream by indirect heat exchange with pressurized nitrogen-enriched stream 121 in heat exchanger 501. Cooled air stream 503 can be further cooled in aftercooler 131 and introduced into air separation system as earlier described. Intermediate heated nitrogen-enriched stream 503 then is further heated in heat exchanger 119 and work expanded in expansion turbine 149 as earlier described.

Figure 6:
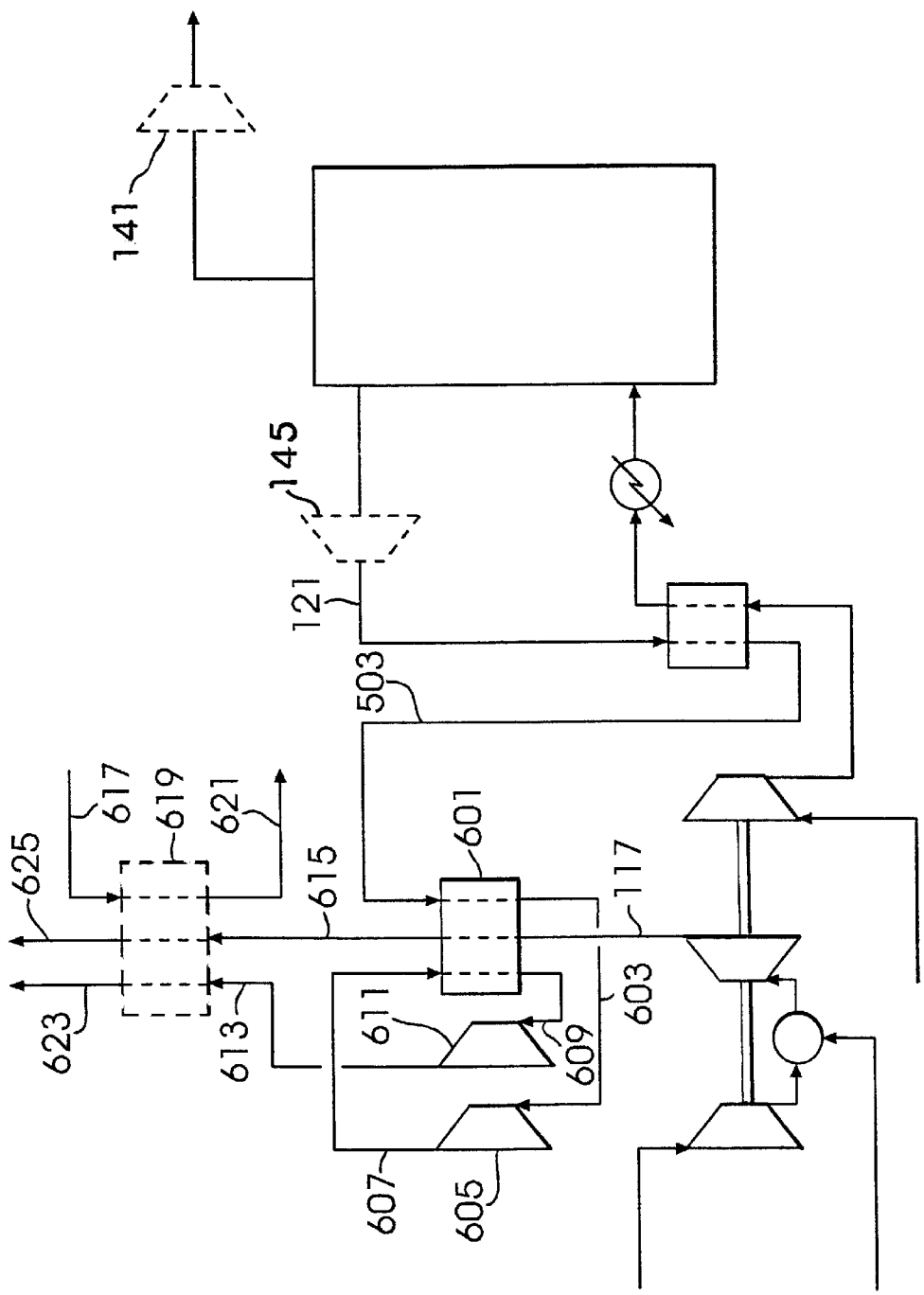
FIG. 6 is a schematic flow diagram of an embodiment of the present invention wherein the exhaust from the nitrogen-enriched product expansion turbine is reheated and expanded in another expansion turbine or turbine stage, and residual heat in the exhaust gas streams from the combustion gas and second nitrogen-enriched product expansion turbine is recovered to provide a heated process stream.

An alternative to the process of FIG. 5 is illustrated in FIG. 6. In this embodiment, additional heat energy can be recovered more effectively when the mass flow rate of gas turbine exhaust stream 117 is greater than that of pressurized nitrogen-enriched stream 121. Reheat is used to balance the exchange of heat between these two streams wherein intermediate heated nitrogen-enriched stream 503 is heated in heat exchanger 601, the resulting heated nitrogen-enriched stream 603 is work expanded to an intermediate pressure in expansion turbine 605, intermediate expanded nitrogen-enriched stream 607 is reheated in heat exchanger 601, and reheated nitrogen-enriched stream 609 is work expanded to atmospheric pressure in expansion turbine 611 to yield expanded nitrogen-enriched stream 613. Shaft work generated by expansion turbines 605 and 611 can be used to drive gas compression equipment within the process, particularly oxygen compressor 141 earlier described, or generate electric power. Alternatively or additionally, the shaft work produced by nitrogen-enriched product expansion turbines 605 and 611 can provide a portion of the work required to drive feed air compressor 127 and gas turbine air compressor 103 (not shown). If nitrogen-enriched product compressor 145 is required, a portion of the work to drive this compressor can be provided by the shaft work generated by nitrogen-enriched product expansion turbines 605 and 611. Shaft work from the nitrogen-enriched product expansion turbines or stages can be used alternatively to drive any other rotating machinery as required.

Nitrogen-enriched product expansion turbines 405 and 411 are shown as two separate expansion turbines, but a single two-stage expansion turbine can be used for the same service if desired.

If expanded nitrogen-enriched stream 613 and cooled gas turbine exhaust stream 615 are at sufficiently high temperatures, additional heat can be recovered from these streams by indirect heat transfer to process stream 617 in heat exchanger 619. These two streams exchange heat with process stream 617 in heat exchanger 619 to yield heated process stream 621, further cooled nitrogen-enriched stream 623, and final exhaust stream 625. Process stream 617 can be any liquid or gaseous process stream. The combustion products in final exhaust stream 625 can be maintained in a single phase without water condensation if desired by limiting the degree of heat transferred to process stream 201. Heated process stream 621 can be a stream of intermediate pressure steam which is expanded in a steam turbine (not shown) to generate electric power, or can be preheated boiler feed water. Alternatively, heated process stream 621 can supply heat to a stream associated with the air separation unit 135, for example a regeneration gas stream used in the temperature swing adsorption feed air purification system. This embodiment is preferred when further cooled nitrogen-enriched stream 623 is to be used elsewhere in the process or external to the process.

In the embodiments of the invention described above, the air separation unit as described is a cryogenic separation system which separates the feed gas by cryogenic distillation. The features of the invention also can be realized when other types of known gas separation processes are used, for example processes which utilize adsorption, membrane permeation, or chemical separation methods. The preferred driver for the air separation unit is a gas turbine combustion engine as described above with reference to FIG. 1, which illustrates a simple single-shaft gas turbine. Any type of gas turbine combustion engine known in the art can be utilized in the present invention, for example, two-shaft or multiple-spool gas turbine systems. Other gas turbine cycle configurations can be used such as those described in the book entitled "The Gas Turbine Manual" by R. J. Welsh and G. Waller, Temple Press Limited, London, 1955, p. 37. Alternatively, an internal combustion engine utilizing an Otto cycle, a Diesel cycle, or other type of cycle can be used as the driver for compression of the air separation unit feed gas stream.

EXAMPLE

The process of FIG. 1 is operated at a barometric pressure of 14.7 psia, an ambient temperature of 91° F., and a relative humidity of 60%; cooling water is available at 90° F. The gas turbine combustion engine as shown in FIG. 1 is used to drive air compressor 127 to supply 686 lb/sec of air at a pressure of 127 psia to air separation unit 135. The air separation unit utilizes a cryogenic distillation process to separate the air into nitrogen-enriched stream 137 at 534 lb/sec and 30.1 psia and oxygen-enriched stream 139 at 152 lb/sec and 31.6 psia with an oxygen purity of 95 vol %. Nitrogen-enriched stream 137 is heated to 950° F. in heat exchanger 119 against exhaust stream 117 and heated nitrogen-enriched stream 147 is work expanded in expansion turbine 149 to yield expanded nitrogen-enriched stream 151 at atmospheric pressure. Expansion turbine 149 generates 28,705 kW of power. Oxygen-enriched stream 139 is compressed in compressor 141 to yield compressed oxygen product stream 143 at 715 psia, which requires 28,705 kW of power. Expansion turbine 149 drives compressor 141 thereby providing the exact amount of work required for compression. This Example illustrates the operation of the process in standalone mode without the need for importing electric power. Fuel 109 provides all the required energy to produce oxygen product 143 at the required pressure and flow rate. Thus the operating pressure of the air separation unit can be selected to produce a nitrogen-enriched product at a pressure and flow rate such that the nitrogen-enriched product can be heated against gas turbine exhaust and work expanded to provide the exact amount of work required for oxygen product compression.

A stream summary for the Example is given below in Table 1 and a power balance is given in Table 2.

TABLE 1

Stream Summary for Example (FIG. 1)

| Stream Number | 101 | 109 | 117 | 121 | 123 | 125 | 129 |
|---|---|---|---|---|---|---|---|
| Pressure psia | 14.55 | 350 | 15.06 | 29.58 | 14.7 | 14.55 | 128.1 |
| Temperature deg F | 91 | 77 | 1022 | 100 | 320 | 91 | 204 |
| Flowrate lbs/sec lbs/sec | 622.2 | 10.8 | 633 | 534.2 | 633 | 695.4 | 686.5 |
| Composition Vol % | | | | | | | |
| Dry Air | 97.06 | 0.00 | 0.00 | 0.00 | 0.00 | 97.06 | 98.79 |
| Water | 2.94 | 0.00 | 8.88 | 3.50 | 8.88 | 2.94 | 1.21 |
| Nitrogen | 0.00 | 0.00 | 73.51 | 94.16 | 73.51 | 0.00 | 0.00 |
| Oxygen | 0.00 | 0.00 | 13.70 | 1.78 | 13.70 | 0.00 | 0.00 |
| Argon | 0.00 | 0.00 | 0.88 | 0.32 | 0.88 | 0.00 | 0.00 |
| Carbon Dioxide | 0.00 | 0.00 | 3.04 | 0.25 | 3.04 | 0.00 | 0.00 |
| Methane | 0.00 | 100.00 | 0.00 | 0.00 | 0.00 | 0.00 | 0.00 |

| Stream Number | 133 | 137 | 139 | 143 | 147 | 151 |
|---|---|---|---|---|---|---|
| Pressure psia | 127.1 | 30.05 | 31.55 | 715 | 28.08 | 14.7 |
| Temperature deg F | 105 | 100 | 100 | 100 | 950 | 754 |
| Flowrate lbs/sec | 686 | 534.2 | 151.8 | 151 | 534.2 | 534.2 |
| Composition Vol % | | | | | | |
| Dry Air | 99.13 | 0.00 | 0.00 | 0.00 | 0.00 | 0.00 |
| Water | 0.87 | 3.50 | 0.00 | 0.00 | 3.50 | 3.50 |
| Nitrogen | 0.00 | 94.16 | 1.80 | 1.80 | 94.16 | 94.16 |
| Oxygen | 0.00 | 1.78 | 95.00 | 95.00 | 1.78 | 1.78 |
| Argon | 0.00 | 0.32 | 3.20 | 3.20 | 0.32 | 0.32 |
| Carbon Dioxide | 0.00 | 0.25 | 0.00 | 0.00 | 0.25 | 0.25 |
| Methane | 0.00 | 0.00 | 0.00 | 0.00 | 0.00 | 0.00 |

TABLE 2

Power Balance for Example

| Equipment Item | Number (FIG. 1) | Shaft Power, kW | Turbine Output Power, kW |
|---|---|---|---|
| Main Air Compressor | 127 | 79746 | |
| Oxygen Compressor | 141 | 28705 | |
| Gas Turbine Engine | 103/107/113/115/128 | 79746 | 79746 |
| Nitrogen Expansion Turbine | 149 | 28705 | 28705 |
| Net Export Power | | 0 | |

Notes:
1) Compressor mechanical, seal losses, and moisture knock-out have been accounted for in the balance.
2) Air separation unit losses have been accounted for in the balance.
3) Power for utilities such as coolant circulation pumps, cooling tower fans, and lubrication system auxiliaries are not included.

Thus the process of the present invention is an alternative method for recovering heat from the gas turbine exhaust in an integrated gas turbine and air separation system in which the gas turbine drives the feed air compressor for the air separation unit. The invention offers an alternative to the well-known method of recovering heat from the gas turbine exhaust heat by a heat recovery steam generator, and is useful for process situations in which a steam generation system with the required boiler feedwater preparation and spent steam condensation systems are not desired. In one disclosed embodiment, the operating pressure of the air separation unit can be selected to produce a nitrogen-enriched product at a pressure and flow rate such that the nitrogen-enriched product can be heated against gas turbine exhaust and work expanded to provide the exact amount of work required for oxygen product compression. The invention provides an efficient and self-contained process for the production of high pressure oxygen without the need for imported electric power.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for the separation of a feed gas mixture comprising oxygen and nitrogen, which method comprises:
   (a) compressing a first gas mixture comprising oxygen to yield a compressed oxidant gas and combusting the compressed oxidant gas and fuel in a combustion engine to generate shaft work and a hot exhaust gas;
   (b) compressing a second gas mixture comprising oxygen and nitrogen to yield a compressed feed gas mixture, and separating the compressed feed gas mixture into two or more product gas streams with differing compositions;
   (c) utilizing the shaft work of (a) to provide at least a portion of the work required for compressing the second gas mixture of (b); and
   (d) heating one of the product gas streams by indirect heat exchange with the hot exhaust gas and work expanding the resulting heated product gas stream to generate shaft work and yield an expanded product gas stream.

2. The method of claim 1 wherein the combustion engine is a gas turbine combustion engine.

3. The method of claim 1 wherein the combustion engine is an internal combustion engine.

4. The method of claim 1 wherein the second gas mixture is air, one of the product gas streams is an oxygen-enriched product gas, and another of the product gas streams is a nitrogen-enriched product gas.

5. The method of claim 4 wherein the nitrogen-enriched product gas provides the product gas of (d), wherein the nitrogen-enriched product gas is heated by indirect heat exchange with the hot exhaust gas, and wherein the resulting heated nitrogen-enriched product gas is work expanded in a nitrogen-enriched product expansion turbine to generate shaft work and yield a reduced-pressure nitrogen-enriched product gas stream.

6. The method of claim 5 wherein the oxygen-enriched product gas is compressed in an oxygen product compressor.

7. The method of claim 6 wherein at least a portion of the work required by the oxygen product compressor is provided by shaft work generated by the nitrogen-enriched product expansion turbine.

8. The method of claim 5 wherein the nitrogen-enriched product gas is compressed in a nitrogen-enriched product compressor before being heated by indirect heat exchange with the hot exhaust gas.

9. The method of claim 8 wherein a portion of the work required by the nitrogen-enriched product compressor is provided shaft work generated by the nitrogen-enriched product expansion turbine.

10. The method of claim 5 wherein the heating of the nitrogen-enriched product gas by indirect heat transfer with the hot exhaust gas yields a cooled exhaust gas, and wherein the cooled exhaust gas and the reduced-pressure nitrogen-enriched product gas stream are further cooled by indirect heat transfer with a process stream to yield a heated process stream.

11. The method of claim 10 wherein the process stream is water and the heated process stream is steam.

12. The method of claim 5 wherein the heating of the nitrogen-enriched product gas by indirect heat transfer with the hot exhaust gas yields a cooled exhaust gas, and wherein the cooled exhaust gas and the reduced-pressure nitrogen-enriched product gas are combined in a heat recovery exchanger and the combined gas is further cooled therein by indirect heat transfer with a process stream to yield a heated process stream.

13. The method of claim 5 which further comprises:
(e) reheating the reduced-pressure nitrogen-enriched product gas by indirect heat transfer with the hot exhaust gas and work expanding the resulting reheated nitrogen-enriched product gas in another nitrogen-enriched product expansion turbine to yield a final nitrogen-enriched product gas at a further reduced pressure.

14. The method of claim 13 wherein the oxygen-enriched product gas is compressed in an oxygen product compressor.

15. The method of claim 14 wherein at least a portion of the work required by the oxygen product compressor is provided by shaft work generated by the nitrogen-enriched product expansion turbines.

16. The method of claim 13 wherein the nitrogen-enriched product gas is compressed in a nitrogen-enriched product compressor before being heated by indirect heat transfer with the hot exhaust gas.

17. The method of claim 16 wherein a portion of the work required by the nitrogen-enriched product compressor is provided by shaft work generated by the nitrogen-enriched product expansion turbines.

18. The method of claim 13 wherein the heating of the nitrogen-enriched product gas by indirect heat transfer with the hot exhaust gas yields a cooled exhaust gas, and wherein the cooled exhaust gas and the reduced-pressure nitrogen-enriched product gas are further cooled by indirect heat transfer with a process stream to yield a heated process stream.

19. The method of claim 18 wherein the process stream is water and the heated process stream is steam.

20. The method of claim 13 wherein the heating of the nitrogen-enriched product gas by indirect heat transfer with the hot exhaust gas yields a cooled exhaust gas, and wherein the cooled exhaust gas and final nitrogen-enriched product gas at a further reduced pressure are combined in a heat recovery steam generator, and the combined gas is further cooled therein by indirect heat transfer with water to yield a heated water stream.

21. The method of claim 13 wherein the heating of the nitrogen-enriched product gas and the reheating of the reduced-pressure nitrogen-enriched product gas by indirect heat transfer with the hot exhaust gas yields a cooled exhaust gas, and wherein the cooled exhaust gas and the final nitrogen-enriched product gas at a further reduced pressure are further cooled by indirect heat transfer with a process stream to yield a heated process stream.

22. The method of claim 4 wherein the air is separated into the oxygen-enriched product gas and the nitrogen-enriched product gas by cryogenic distillation.

23. An apparatus for the separation of air which comprises:
(a) a first air compressor to compress air, thereby providing a first pressurized air feed stream;
(b) a second air compressor to compress air, thereby providing a second pressurized air feed stream;
(c) a gas turbine combustor for combusting fuel with the first pressurized air feed stream to yield a hot pressurized gas and a gas turbine expansion turbine for work expanding the hot pressurized gas to yield a hot exhaust gas, wherein the gas turbine expansion turbine is mechanically linked with the first and second air compressors such that work from the gas turbine expansion turbine drives the first and second air compressors;
(d) piping means for flow of the first pressurized air feed stream from the first air compressor to the gas turbine combustor and for flow of the hot pressurized gas from the gas turbine combustor to the gas turbine expansion turbine;
(e) cooling means to cool the second pressurized air feed stream to provide a cooled pressurized air feed stream;
(f) piping means for flow of the second pressurized air feed stream from the second air compressor to the cooling means;
(g) an air separation system to separate the cooled pressurized air feed stream into at least an oxygen-enriched product gas and a nitrogen-enriched product gas; and
(h) piping means for flow of the cooled pressurized air feed stream from the cooling means to the air separation system;
(i) heat exchange means to heat the nitrogen-enriched product gas by indirect heat exchange with hot exhaust gas from the first expansion turbine;
(j) a hot nitrogen-enriched product gas expansion turbine for work expanding the resulting hot nitrogen-enriched product gas from the heat exchange means; and
(k) piping means for flow of the nitrogen-enriched product gas from the air separation system to the heat exchange means and for flow of the hot exhaust gas from the gas turbine expansion turbine to the heat exchange means.

\* \* \* \* \*